US011706321B2

(12) United States Patent
Huang et al.

(10) Patent No.: US 11,706,321 B2
(45) Date of Patent: Jul. 18, 2023

(54) SYSTEM AND METHOD FOR USING T8 API TO DELIVER DATA OVER AN IP PATH (71) Applicant: Verizon Patent and Licensing Inc., Basking Ridge, NJ (US)

(72) Inventors: Ye Huang, San Ramon, CA (US); Michael R. Waters, Staten Island, NY (US); Gerardo S. Libunao, Manalapan, NJ (US); Sameer Muhammad Farooqi, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 526 days.

(21) Appl. No.: 16/109,926

(22) Filed: Aug. 23, 2018

(65) Prior Publication Data

US 2020/0068047 A1 Feb. 27, 2020

(51) Int. Cl.
*H04L 69/08* (2022.01)
*H04W 84/04* (2009.01)
*H04L 67/141* (2022.01)

(52) U.S. Cl.
CPC .......... *H04L 69/08* (2013.01); *H04L 67/141* (2013.01); *H04W 84/042* (2013.01)

(58) Field of Classification Search
CPC ..... H04L 67/141; H04L 69/08; H04W 84/042
See application file for complete search history.

(56) References Cited

U.S. PATENT DOCUMENTS

| 2019/0058741 | A1* | 2/2019 | Mufti ..................... H04L 67/02 |
| 2019/0090123 | A1* | 3/2019 | Abraham ................ H04L 67/14 |
| 2019/0200414 | A1* | 6/2019 | Abraham .............. H04W 76/32 |
| 2019/0261453 | A1* | 8/2019 | Jain ......................... H04W 8/08 |
| 2019/0313468 | A1* | 10/2019 | Talebi Fard ............ H04W 8/02 |
| 2021/0243126 | A1* | 8/2021 | Campo Trapero ...... H04L 67/55 |
| 2021/0297834 | A1* | 9/2021 | Zhang .................... H04W 4/70 |
| 2021/0368558 | A1* | 11/2021 | Wang .................... H04W 4/70 |

OTHER PUBLICATIONS

3GPP TS 29.122 V15.0.0 (Jun. 2018); Technical Specification; 3rd Generation Partnership Project; Technical Specification Group Core Network and Terminals; T8 reference point for Northbound APIs; (Release 15) (Year: 2018).*

* cited by examiner

*Primary Examiner* — Derrick W Ferris
*Assistant Examiner* — M Mostazir Rahman (57) ABSTRACT A system may receive a request from the UE device to establish a session over a user plane of a network; establish a session over the user plane in response to the request from the UE device; receive, at a first node, uplink IP data from the UE device over the session; redirect the received IP data at the first node to a second node for translating IP data to a T8 message; translate, at the second node, the redirected IP data to a first T8 message; and forward the first T8 message to an application server or an application function (AF) node.

20 Claims, 9 Drawing Sheets

```
1    URL: http://scef.mylab.com:12345/SCEF/v1/Nidd/Mt
2    HTTP Method: POST
3    HTTP Headers:
4            Authorization: Basic with username/password
5            Content-Type: Application/Json
6    HTTP Body:
7    {
8            "FSendviaUP": "True",
9            "msisdn": "12345678912",
10           "scsAsId": "testniddserv",
11           "ttri": "1111",
12           "tltri": "12343",
13           "nonIpData": "bXRkYXRhXzE="
14   }
```

SYSTEM AND METHOD FOR USING T8 API TO DELIVER DATA OVER AN IP PATH

BACKGROUND INFORMATION

To satisfy the needs and demands of users of mobile communication devices, providers of wireless communication services continue to improve available services. One aspect of such improvements includes the development of wireless access networks as well as options to utilize the networks. Such networks may service not only smart phones, but also other types of devices, such as Internet-of-Things (IoT) devices in different operating modes. For example, a network may service devices that are in the Extended Discontinuous Reception (eDRX) mode or the Power Savings Mode (PSM).

DETAILED DESCRIPTION OF PREFERRED EMBODIMENTS

The following detailed description refers to the accompanying drawings. The same reference numbers in different drawings may identify the same or similar elements.

A typical T8 Application Programming interface (API) framework uses a T8 API, which supports a Non-Internet Protocol (IP) Data Delivery (NIDD) but may not necessarily support IP data transport. For mobile network operators (MNOs), this raises a number of cost-related and technical issues that stem from the potential incompatibility between a network component that communicates over an IP layer and an application function (AF) node (also referred to as application server AS)) that uses the non-IP T8 API framework.

For example, an MNO may need an AF node that provides both a T8 API and a legacy data interface to service older types of devices. An AF node may require Internet-of-Things (IoT) devices, with which the AF node communicates, to be T8 API compliant. Examples of T8 API compliant IoT devices include Category M1 (CAT-M1) and Narrow Band (NB)-IoT devices with Extended Discontinuous Reception (eDRX) and Power Savings Mode (PSM) capabilities for increasing battery life. Because there are older types of devices which need to be serviced, however, the AF node still may need to maintain a legacy data interface. For example, the AS may need to maintain both T8 API and legacy data interfaces to provide services for monitoring reachability, connectivity, and availability after a downlink delivery notification (DDN) failure.

In one example, an MNO may need an AF node that provides both a legacy IP-based API and T8 API. An IoT device (e.g., user equipment (UE) device) may include and use IP-based platform software, such as software for upgrading, software for location tracking information transfer (e.g., via. User Plane), and software for using the Secure User Plane Location (SUPL) protocol.

In another example, an MNO may need an AF node that not only supports both a T8 API and IP-based devices, but, at the same time, provides a high level of security to the IP-based devices. However, if the AF node were to provide a Mobile Virtual Private Network (MVPN) that extends from a UE device to the AF node or providing certificate-based security, the AF node also has to bear a high computational load due to large number of T8 IoT devices that the AF node must manage.

Still, in another example, an MNO may need an AF node that can provide support for platforms which use legacy protocols, such as Lightweight Machine-to-Machine (LWM2M), Constrained Application Protocol (CoAP), and Message Queuing Telemetry Transport (MQTT) protocol. However, LWM2M, CoAP, and MQTT protocols are based on IP, which T8 API frameworks do not need to support.

Figure 1:
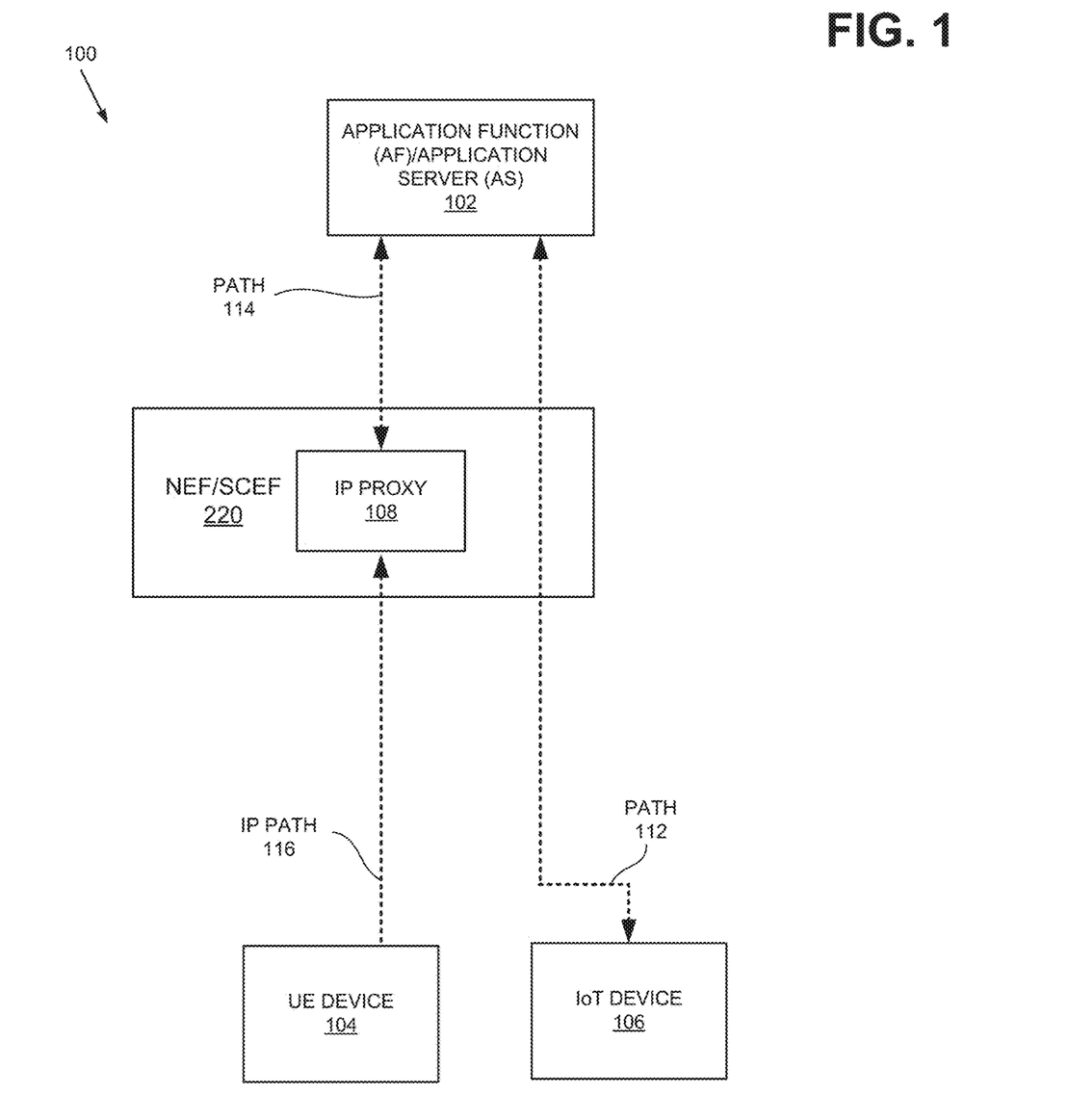
FIG. 1 illustrates exemplary functional components that are associated with the systems and methods described herein.

Systems and methods described herein address each of the issues described above. FIG. 1 illustrates exemplary functional components that are associated with the systems and methods. As shown, the functional components may include an application function (AF) node (also denoted as application server (AS)) 102, a UE device 104, an IoT device 106, and an Internet Protocol (IP) proxy 108 provided within NEF/SCEF node 220. Although the system includes other components, such as those shown in FIG. 2B, for the purpose of simplicity, they are not illustrated in FIG. 1 and are omitted in the following description of FIG. 1.

In FIG. 1, AF node 102 provides a service to IoT device 106 over a communication path (i.e., a T8 API transport path) 112. Because AF node 102 uses the T8 API framework that is independent of an IP network layer (e.g., T8 API may or may not rely on the IP layer) to communicate, AF node 102 cannot interact directly with UE device 104. To extend AF node 102's service to UE device 104, therefore, IP Proxy 108 is included to translate messages to and from AF node 102 and HE device 104. With IP Proxy 108 in place (e.g., within NEF/SCEF node 220), AF node 102 may service UE device 104 as well as other network devices that are compliant with the T8 API.

During IP Proxy operation, when AF node 102 sends mobile terminated (MT) T8 messages to UE device 104 over a communication path 114, IP Proxy 108 intercepts the T8 messages, translates the T8 messages into IP messages, and forwards the IP messages to UE device 104 over IP path 116. Conversely, when UE device 104 sends mobile originated (MO) IP messages to AF node 102 over IP path 116, IP Proxy 108 intercepts the IP messages, rewrites the IP messages as T8 messages, and forwards the T8 messages to AF node 102 via path 114.

IP Proxy 108 in FIG. 1 addresses the interworking between AF node 102 and a component (e.g., UE device 104) that communicates over an IP layer. Furthermore, by addressing the incompatibility, IP Proxy 108 also addresses each of the above described issues that stem from the incompatibility, such as: extending eDRX and PSM related services to IP devices; monitoring reachability, connectivity, and availability of an IP device; supporting IP based application installed on IP devices using AF node 102; and extending security to IP devices that access AF node 102 services.

Figure 2A:
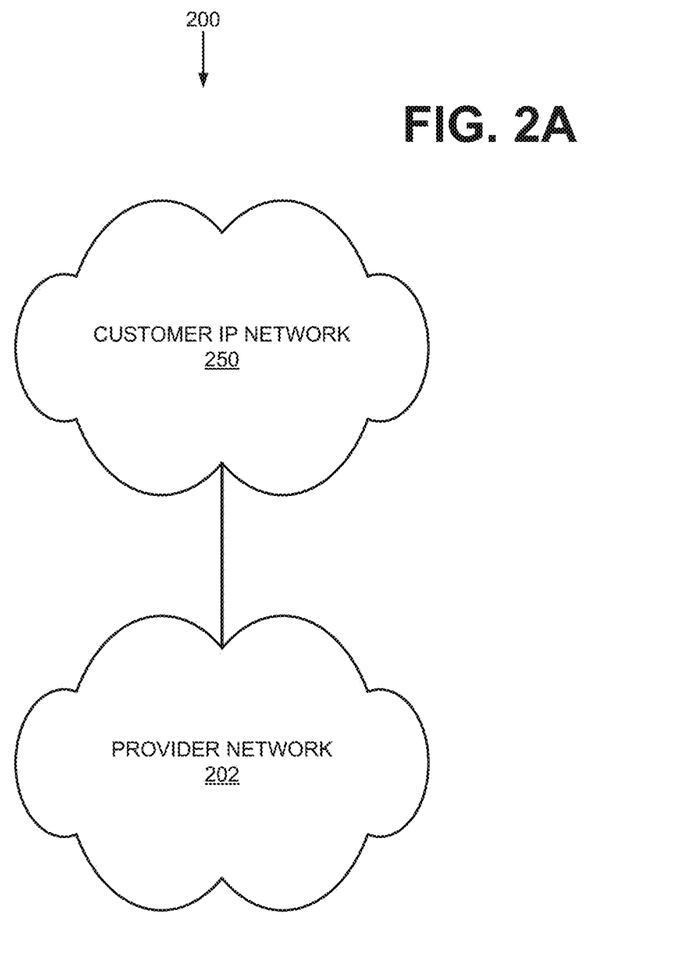
FIG. 2A illustrates an exemplary network environment in which the components of FIG. 1 may be implemented.

FIG. 2A illustrates an exemplary network environment 200 in which the components of FIG. 1 may be implemented. As shown, network environment 200 may include a provider network 202 (e.g., MNO) and a customer IP network 250. Depending on the implementation, network environment 200 may include additional networks than those illustrated in FIG. 2A. For simplicity, FIG. 2A does not show all components that may be included in network environment 200 (e.g., routers, bridges, wireless access point, additional UE devices, etc.).

Provider network 202, which may also be referred to as a Mobile Network Operator (MNO), may include a local area network (LAN), a wide area network (WAN), a metropolitan area network (MAN), an optical network, a cable television network, a satellite network, a wireless network (e.g., a CDMA network, a general packet radio service (GPRS) network, an LTE network (e.g., 4th Generation (4G) network), a 5th Generation (5G) network, an ad hoc network, a telephone network (e.g., the Public Switched Telephone Network (PSTN) or a cellular network), an intranet, or a combination of networks. Provider network 202 may allow the delivery of Internet Protocol (IP) services to UE device 104, and may interface with other external networks, such as customer IP network 250. In some implementations, provider network may include one or more packet data networks.

Customer IP network 250 may include a network that supports Internet Protocol (IP)-based communications.

Figure 2B:
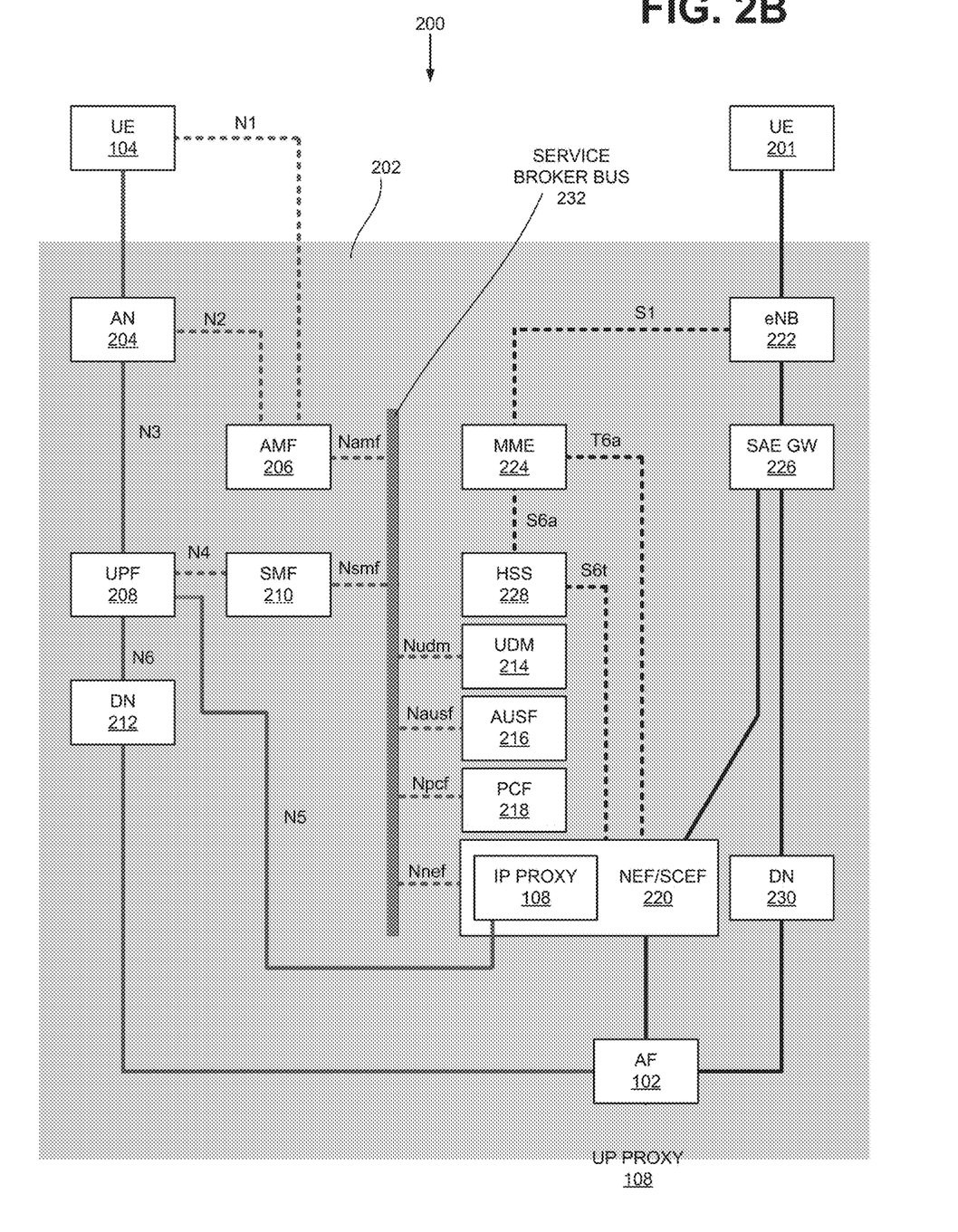
FIG. 2B illustrates exemplary functional components of the network environment of FIG. 2A.

FIG. 2B illustrates exemplary functional components of network environment 200. As shown, network environment 200 may include a UE devices 104 and 201 and provider network 202. As further shown, provider network 202 may include an Access Network (AN) (or a radio access network (RAN)) 204, Access and Mobility Function (AMF) node 206, User Plane Function (UPF) node 208, Session Management Function (SMF) node 210, data network (DN) 212, Unified Data Management (UDM) node 214, Authentication Server Function (AUSF) node 216, Policy Control Function (PCF) node 218, Network Exposure Function (NEF) node 220, IP Proxy 108, Application Function (AF) node 102, evolved Node 13 (eNB) 222, Mobility Management Entity (MME) 224, System Architecture Evolution (SAE) Gateway (GW) 226, Home Subscriber Server (HSS) 228, DN 230, and a service broker bus 232.

In FIG. 2B, provider network 202 is illustrated as including components of both a 4G network and 5G network. AN 204, AMF node 206, UPF node 208, SMF node 210, UDM node 214, AUSF node 216, PCF node 218, NEF node 220, and AF node 102 are 5G components, while eNB 222, MME 224, SAE GW 226, and HSS 228 are 4G components. IP Proxy 108, DN 212, and DN 230 may belong to a 4G network and/or a 5G network. In FIG. 5B, dotted lines indicate control plane (CP) links and/or interfaces, and solid lines represent user plane (UP) links and/or interfaces.

UE device 104 and UE device 201 may each include a handheld wireless computational, communication device. Examples of a UE device includes: a smart phone; a tablet device; a wearable computer device (e.g., a smart watch); a global positioning system (GPS) device; a laptop computer; a media playing device; a portable gaming system; an IoT device. In some implementations, UE device 104 may correspond to a wireless MTC device that communicates with other devices over a machine-to-machine (M2M) interface, such as LTE-M or Category M1 (CAT-M1) devices and Narrow Band (NB)-IoT devices.

AN 204 may provide access to provider network 202, for wireless devices, such as UE device 104. AN 204 may include base stations (e.g., eNB or gNB) via which UE devices 104 can wirelessly communicate with AN 204.

AN 204 may include a 5G access network, an LTE Advanced (LTE-A) access network, and/or another advanced access network that provide access to: MTC devices, such as 1.4 MHz wide enhanced MTC (eMTC) devices (also referred to Cat-M1 devices); Low Power Wide Area (LPWA) devices such as NB-IoT (NB-IoT) devices; and/or other types of MTC devices; and/or other types of LTE-A and/or 5G devices.

AMF node 206 may perform registration management, connection management, reachability management, mobility management, lawful intercepts, Short Message Service (SMS) transport between UE device 104 and an SMS function (not shown in FIG. 2B), session management message transport between UE device 104 and SMF node 210, access authentication and authorization, location services management, management of non-3GPP access networks, and/or other types of management processes. AMF node 206 may be accessible by other function nodes via an Namf interface.

UPF node 208 may maintain an anchor point for intra/inter-Radio Access Technology (RAT) mobility, maintain an external packet data unit (PDU) point of interconnect to a data network (e.g., DN 212, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffeting, send and forward an "end marker" to a radio access network node (e.g., gNB), and/or perform other types of user plane processes. UPF 208 may communicate with AN 204 SMF node 210, and DN 212 using an N3, N4 and N6 interfaces, respectively.

In some implementations, UPF node 208 may load, from PCF node 218, a Policy and Charging Control (PCC) rule that requires UPF node 208 to redirect UE device 104-originated IP data to NEF 220 and/or IP Proxy 108. After loading the PCC rule, UPF node 208 may forward UE device 104-originated IP messages to either NEF node 220 and/or IP Proxy 108.

SMF node 210 may perform session establishment, modification, and/or release, perform IP address allocation and management, perform Dynamic Host Configuration Protocol (DHCP) functions, perform selection and control of UPF node 208, configure traffic steering at UPF 208 to guide traffic to the correct destination, terminate interfaces toward PCF node 218, perform lawful intercepts, charge data collection, support charging interfaces, terminate session management of Non-Access Stratum (NAS) messages, perform downlink data notification, manage roaming functionality, and/or perform other types of control plane functions for managing user plane data. SMF node 210 may be accessible via an Nsmf interface.

In some implementations, SMF node 210 may receive an Nsmf message NotifyProtranslate from NEF node 220. In response, SMF node 210 registers NEF node 220 or IP Proxy 108 for a notification service associated with UE devices 104. Thereafter, when a UE device 104 attaches to or detaches from provider network 202, SMF 210 may send a notification message to NEF node 220 or IP Proxy 108.

Based on the notification message, NEF 220 and/or UE proxy 108 may update a routing table.

DN 212 and DN 230 may each provide operator services, interact access, or another type of service. DN 212/230 may exchange data with UE device 102/201 or a network component through UPF node 208 and/or SAE GW 226.

UDM 214 may maintain subscription information for UE devices 104, manage subscriptions, generate authentication credentials, handle user identification, perform access authorization based on subscription data, perform network function registration or subscription management, maintain service and/or session continuity by maintaining assignment of SMF node 210 for ongoing sessions, support SMS delivery, support lawful intercept functionality, and/or perform other processes associated with managing user data. UDM 214 may be accessible via a Nudm interface.

AUSF node 216 may store and manage authentication data for UE devices. AUSF node 216 may be accessible through an Nausf interface or another type of interface (e.g., N12, N13, etc.

PCF node 218 may support policies to control network behavior, provide policy rules to control plane functions (e.g., to SMF node 210), access subscription information relevant to policy decisions, perform policy decisions, and/or perform other types of processes associated with policy enforcement. PCF node 218 may be accessible via an Npcf interface.

In some implementations, PCF node 218 may include a PCC rule for a node to redirect UE device-originated IP messages to NEF node 220 or IP Proxy 108. PCF node 218 may provide the rule to UPF node 208.

NEF node 220 may expose capabilities and events to other network functions, including 3rd party network functions, application functions, edge computing network functions, and/or other types of network functions. Furthermore, NEF node 220 may secure provision of information from external applications to AN 204, translate information between AN 204 and devices/networks external to AN 204, support a Packet Flow Description (PFD) function, and/or perform other types of network exposure functions. NEF node 220 may be accessible through an Nnef interface.

In some implementations, NEF node 220 may manage IP Proxy 108. For example, NEF node 220 may instantiate (create) IP Proxy 108 having a table listing one or more AF nodes 102 each with a fully qualified domain name (FQDN) and an IP address during an on-boarding process associated with one or more AF nodes 102.

In FIG. 2B, NEF node 220 is illustrated as communicating with other 5G network components. For non-5G components, NEF node 220 may be replaced with another functional node. For example, with respect to 4G network components in FIG. 2B, SCEF node 220 may take the place of NEF node 220. SCEF 220 is illustrated as interfacing with eNB 222, MME 224, and SAE GW, 226. Depending on the implementation, SCEF 220 may provide for the functionalities of NEF 220 and/or IP Proxy 108.

As described herein, IP Proxy 108 receives T8 messages from AF node 102, translates the T8 messages into IP messages, and forwards the IP messages, via UPF node 208, to destination UE devices 104. In addition, IP Proxy 108 may receive UE device-originated IP messages from UPF node 208, translate the IP message into T8 messages, and forward the T8 messages to the destination AF nodes 102.

In one implementation, IP Proxy 108 may use a routing table to translate the messages. For example, such a routing table may map an AF/AS URL, AF/AS IP address, and AF/AS port number to a corresponding UE ID, UE device IP address, and UE port number. To construct or update the routing table, IP Proxy 108 may obtain address information for UE devices 104 and AF nodes 102. In some implementations, IP Proxy 108 may obtain AF node address information during an AF node on-boarding. In addition, IP Proxy 108 may obtain UE device address information from SMF node 210. Because NEF node 220 is subscribed to a notification service pertaining to UE devices 104, IP Proxy 108 (through NEF 22) may receive the UE device address information from SMF node 210 when the UE device 104 attaches to or detaches from provider network 202. IP Proxy 108 may be capable of terminating transport protocols, such as user datagram protocol (UDP), transport control protocol (TCP), etc.

AF node 102 (or AS 102) may provide application services. Examples of application services include application on routing, accessing NEF node 220, interacting with a policy framework for policy control, and/or other types of application services. In some implementations, AF node 102 may service a large number of IoT devices. Such AF node 102 may send messages via T8 API, for example, to devices in DN 212/230. AF node 102 may be accessible via a Naf interface.

eNB 222 may include one or more devices and components that allow UE device 201 to wirelessly connect to provider network 202. eNB 222 may be part of an evolved UMTS Terrestrial Network (eUTRAN). Although FIG. 2B only shows eNB 222, in some implementations, eNB 222 may be replaced by or used in conjunction with gNB within the context of other components compatible with 4G, 5G, and/or another type of network.

MME 224 may provide control plane processing for an evolved packet core (EPC) in provider network 202. For example, MME 224 may implement tracking and paging procedures for UE device 201, may activate and deactivate bearers for UE device 201, may authenticate a user of UE device 201 and may interface to non-LTE radio access networks. A bearer may represent a logical channel with particular QoS requirements. MME 224 may also select a particular serving gateway (SGW) for a particular UE device 201. MME 224 may communicate with eNB 222 and SCEF 220 through S1 interface and T6a interface, respectively.

SAE-GW 226 may function as both a serving gateway (SGW) and a packet data network gateway (PGW). Like an SGW, SAE-GW 226 may provide an access point to UE device 201, handle forwarding of data packets for UE device 201, perform transport level markings (e.g., QoS Class Identifier (QCI)), and act as a local anchor point during handover procedures between eNBs. In addition, like a PGW, SAE-GW 226 may function as a gateway to DN 230. When UE device 201 attaches to network 202. SAE-GW 226 may allocate an IP address for UE device 201. Furthermore, when SAE-GW 226 receives a message from a Policy and Charging Rules Function (PCRF) to modify a QoS for UE device 201, SAE-GW 226 may change the bearer for UE device 201.

HSS 228 may provide user subscription, registration, and profile information to other components in provider network 202 and store such information at itself or other components (e.g., Authentication Authorization and Accounting (AAA) server). When MME 224 requests HSS 228 for authentication data, HSS 228 may access the AAA to retrieve the data and provide it to MME 224. HSS 228 may interface with MME 224 and SCEF 220 via S6a and S6t, respectively.

Service broker bus 232 may include hardware and/or software components for providing CP communication between different nodes.

Depending on the implementation, network environment 200 may include additional, fewer, different, or a different arrangement of components than those illustrated in FIG. 2B (e.g., routers, bridges, servers, etc.). For example, although not illustrated, network environment 200 may include additional 4G, 5G, or another type of network components (e.g., a PCRF, an AAA, a PGW, a SGW, etc.).

Figure 3:
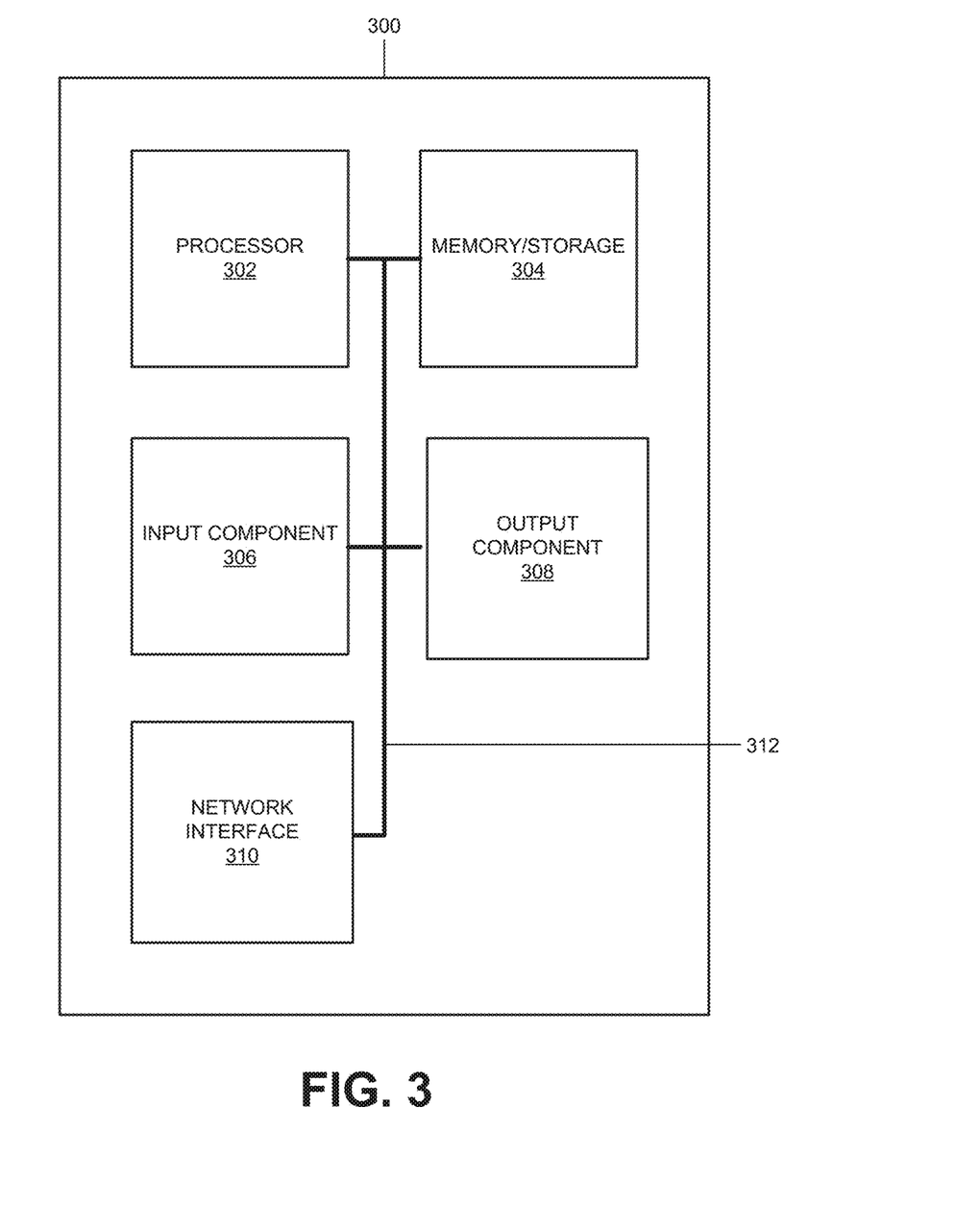
FIG. 3 illustrates exemplary components of network devices that are associated with the network environment of FIG. 2A and the functional components of FIG. 2B.

FIG. 3 is a block diagram of exemplary components of a network device 300. Network device 300 may correspond to or be included in any of the devices and/or components illustrated in FIG. 1, FIG. 2A, and FIG. 2B (e.g., UE device 104/201, provider network 200, SAE GW 226, etc.). For example, depending on the implementation, network devices 300 may be part of network nodes (e.g., NEF 220).

As shown, network device 300 may include a processor 302, memory/storage 304, input component 306, output component 308, network interface 310, and communication path 312. In different implementations, network device 300 may include additional, fewer, different, or different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic embedded devices) capable of controlling device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD) digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may provide input and output from/to a user to/from device 300. Input/output components 306 and 308 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (a WLAN, WiFi, WiMax, etc.), a satellite-based network, optical network, etc. Network interface 310 may include a modem, an Ethernet interface to a LAN, and/or an interface/connection for connecting device 300 to other devices (e.g., a Bluetooth interface).

Communication path 312 may provide an interface through which components of device 300 can communicate with one another.

Network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory/storage 304, when executed by processor 302, may cause processor 302 to perform processes that are described herein.

For example, when NEF node 220 is implemented as a network function on a network device 300, the network device 300 may execute computer instructions that correspond to NEF 220 creating IP Proxy 108. In another example, when IP Proxy 108 is implemented as a network function on network devices 300, the network devices 300 may execute computer instructions that correspond to IP Proxy 108 translating T8 API messages into IP messages or translating IP messages into T8 API messages.

Figure 4:
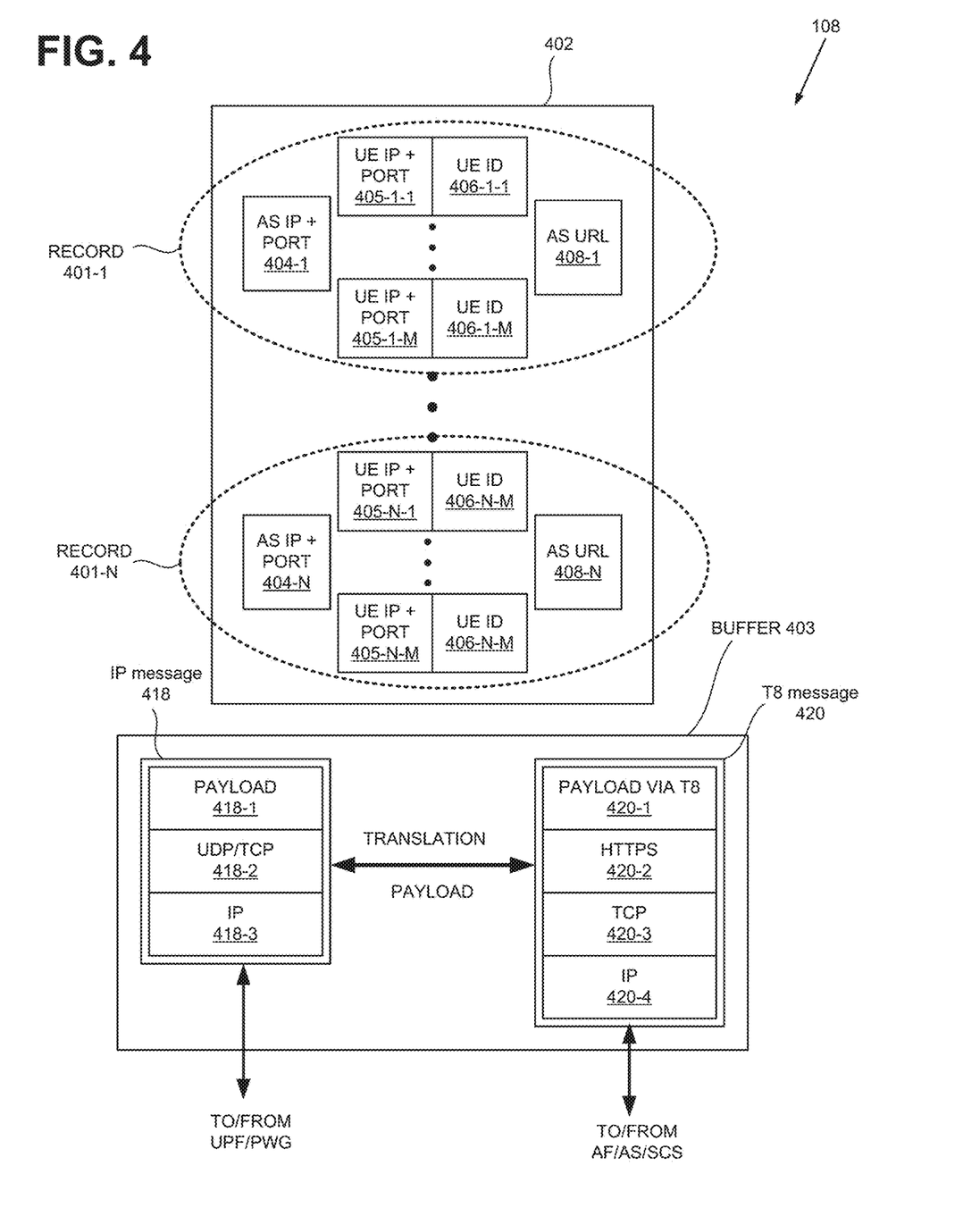
FIG. 4 illustrates some exemplary functions of the IP Proxy of FIG. 2B.

As described above, IP Proxy 108 may maintain a routing table that IP Proxy 108 may use for: translating UE device-originated IP messages into T8 messages and forwarding the translated T8 messages to AF nodes 102; and translating AF node 102-originated T8 API messages into IP messages and forwarding the translated IP messages to UE devices 104. FIG. 4 illustrates these functions of IP Proxy 108.

As shown, IP Proxy 108 may include a routing table 402 and a message buffer 403. Routing table 402 may include records 401-1 through 401-N (N is an integer). As further shown, each record 401 may include an Application Server (AS) IP and port field 404-1, UE IP and port fields 405-1-1 through 405-1-M, UE-ID fields 406-1-1 through 406-1-M, and an AS URL field 408-1. AS IP and port field 404-1 may include an IP address and a port number that correspond to a particular AF node. In one implementation, AS IP and port field 404-1 and AS URL field 406 for each record 401 may be filled with an IP address, a port number, and a URL associated with a particular AF node 102 when the particular AF NODE 102 registers with IP Proxy 108 during on-boarding processes for the AF nodes 102.

Each of UE IP and port fields 405-1 and UE ID fields 406-1 may include an IP address, a port number, and an identifier (e.g., IMSI, MSISDN, etc.) that are associated with a particular UE device 104. When UE device 104 attaches to or detaches from provider network 202, SMF 210 may notify NEF 220 and/or IP Proxy 108 with the IP address and the UE device ID. IP Proxy 108 may insert or delete the UE device entry, depending on whether the UE device 104 attached or detached from provider network 202. IP proxy 108 may capture the port number of UE device 104 when it receives MO IP messages from UE device 104.

As explained above, IP Proxy 108 may translate and forward UE device 104-originated IP messages to AF node 102 and AF node 102-originated T8 API messages to UE device 104. As explained below, the translation function of IP Proxy 108 is simple and hence easy to implement.

For IP proxy 108 to perform these translations, NEF/SCEF 220 may be involved in IP proxy 108 setup. For example, NEF/SCEF 220 (or in some implementations, IP proxy 108 itself) may receive a call (e.g., a NotifyIPProxy) from SMF node 210. The call may provide information regarding UE ID and the IP address assigned to UE device 104 (e.g., by MME 24, a PGW, SAE-GW 226, etc. in a 4G network). The information may be stored in table 402 for IP processing (e.g., T8 API to IP or IP to T8 API). For processing uplink mobile-originated (MO) data, each UDP/TCP packet may contain the destination port number for the packet. For the MT IP data, port numbers are either predetermined during AF on-boarding processes or, alternatively, may be dynamically provided by T8 MT message specifying which port number the message is intended. Each port number may indicate a specific application instance associated with the port number.

As part of its operation, IP Proxy 108 may receive messages from different nodes in provider network 202. When IP Proxy 108 receives a UE device 104-originated IP message 418 from UPF node 208, IP Proxy 108 may place the IP message 418 in buffer 403. IP Proxy 108 may then translate the IP message into a T8 message. As shown in FIG. 4, a payload 418-1 of IP message 418 may be translated into a T8 message payload 420-1. A TCP field 418-2 and an IP field 418-3 are used to form TCP field 420-3 and IP field 420-4 respectively in a new T8 message 420. It is noted that during the translation, IP proxy 108 may set up and maintains a TCP session with UE device 104.

To form HTTPS field 420-2, IP Proxy 108 needs the URL associated with the destination AF node 102. Accordingly, IP Proxy 108 performs a database query (or another process to locate a particular record) to retrieve a record 401 in table 402, using the destination IP address and port number indicated in the IP message (i.e., the IP address and the port number of the destination AF node 102). Next, UE proxy 108 may use the UE device ID (e.g., IMSI, MSISDN, etc.) to locate information pertaining to particular UE device 104, in the record 401, to obtain an AS URL. IP Proxy 108 may use the URI, to form HTTPS field 420-2. When T8 message 420 is complete, IP Proxy 108 may forward T8 message 420 to the destination AF node 102.

When IP Proxy 108 receives a T8 message 420 originating from an AF node 102, IP Proxy may place T8 message 420 is in buffer 403. For mobile terminated (MT) message delivery, T8 API may include a flag "SendviaUP" set to "True." Therefore, when IP Proxy 108 detects the flag in T8 message 420, IP Proxy 108 may translate T8 message 420 into a new IP message 418. As shown, payload 420-1 of T8 message 420 is translated into IP message payload 418-1. In a different implementation, NEF/SCEF 220 may be configured such that IP proxy 108 translates T8 API messages only from specific AF nodes 102 or those addressed to specific UE devices 104.

To form TCP field 418-2 (or a UDP field) and IP field 418-3, IP Proxy 108 needs a UE device IP address and its port number. Accordingly, IP Proxy 108 performs a database query (or another record retrieval procedure) up a record 401 in table 402 using the AS IP address provided in T8 message 420 to identify the record 401. Next, IP Proxy 108 uses a UE device ID also provided in T8 message 420 to locate a particular UE IP and port field 405. IP Proxy 108 may then use the IP address and the port number provided in field 405 to form TCP field 418-2 and IP field 418-3 of the IP message 418. When the IP message 418 is complete, IP Proxy 108 may forward the IP message 418 to the destination UE device 104.

Although FIG. 4 illustrates a routing table 402 with a specific structure, in other implementations, IP Proxy 108 may use different data structures to organize address information. Additionally, in other implementations, table 402 may include additional, fewer, and/or different fields than those illustrated in FIG. 4.

Figure 5:
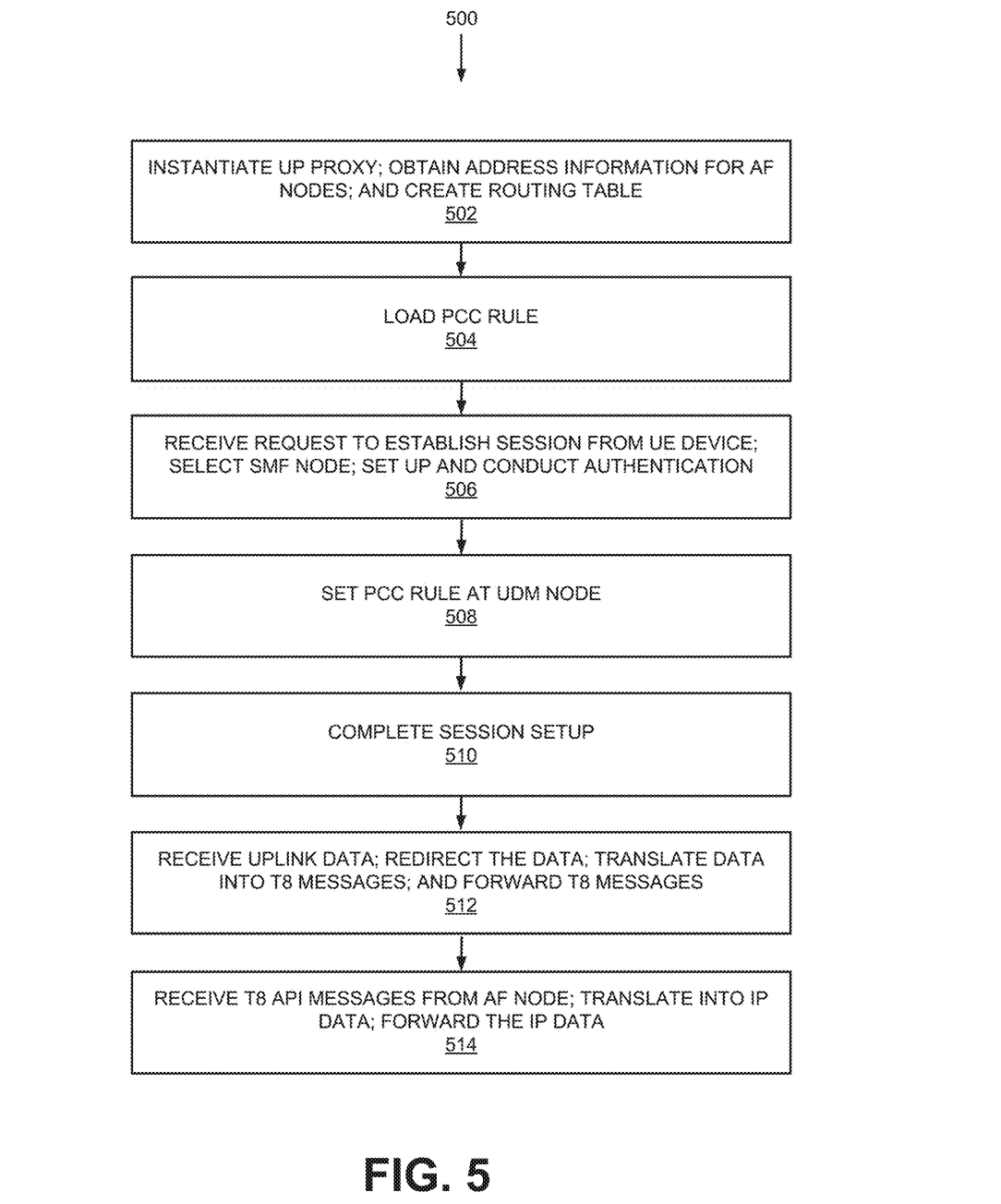
FIG. 5 is a flow diagram of an exemplary process that is associated with the functional components of FIG. 2B.
Figure 6A:
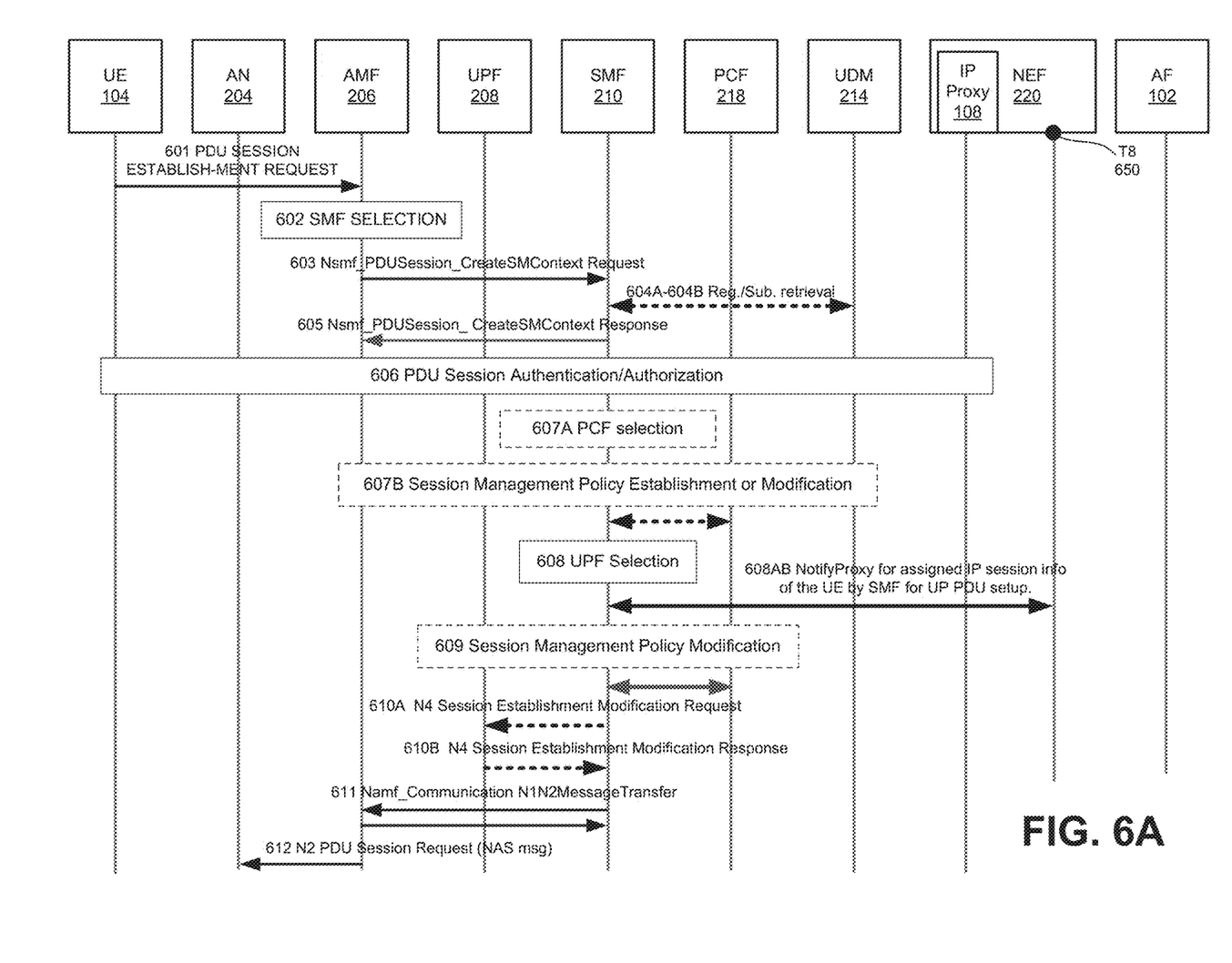
FIGS. 6A and 6B are a messaging diagram that is associated with the process of FIG. 5.
Figure 6B:
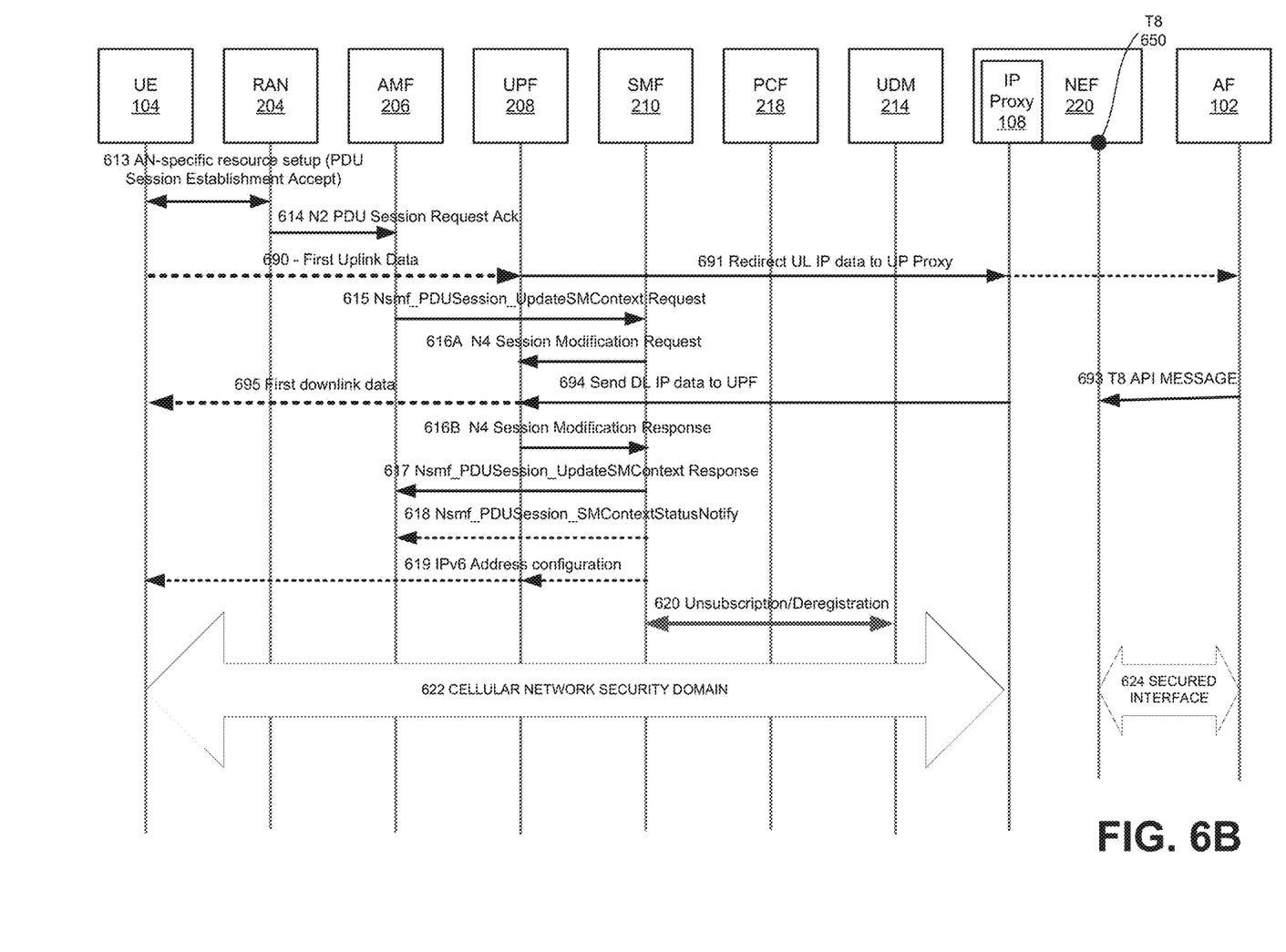

FIG. 5 is a flow diagram of an exemplary process that is associated with the functional components of FIG. 2B. FIGS. 6A and 6B illustrate a messaging diagram that is associated with process 500. One or more components in FIG. 2B may perform process 500.

As shown, process 500 may include creating or instantiating IP Proxy 108; obtaining address information for AF nodes 102; and creating a routing table (block 502). For example, NEF node 220 may instantiate or create IP Proxy 108. IP Proxy 108 or NEF node 220 may create a routing table 402. Routing table 402 may include records 401, each of which corresponds to a particular AF node 102. As shown in FIG. 4, each record 401 may include fields for holding the IP address of AF node 102, a port number associated with AF node 102, and a URL associated with AF node 102.

Process 500 may also include loading PCF node 218 with a Policy Charging Control (PCC) rule (block 504). When a UPF node 208 later obtains and applies the rule (see block 508 below), UPF node 208 may redirect UE device 104-originated IP messages to IP Proxy 108.

Process 500 may include receiving a request to establish a session from UE device 104, selecting SMF node 210; and setting up and conducting an authentication of UE device 104 (block 506). As shown in FIG. 6A, UE device 104 may send a request to establish a session with AMF node 206, via AN 204 (601). In response, AMF node 206 may select SMF node 210 for UE device 104, and request SMF node 210 to create a session context for UE device 104 (603-Nsmf_PDUSession_CreateSMContextRequest). SMF node 210 may respond by retrieving subscription information pertaining to UE device 104 from UDM node 214 (604A and 604B). Next, SMF node 210 may send a reply to AMF node 206 (605—Nsmf_PDUSession_CreateSMContext Response). AMF node 206 may initiate an authentication/authorization procedure involving one or more components of provider network 202 and UE device 104 (606).

Assuming that the authentication is successful at block 506, process 500 may include selecting a PCF node 218, selecting a UPF node 208, and setting the PCC rule at the UPF node 208 (block 508). As shown in FIG. 6A, SMF node 210 may first select PCF node 218 (607A) and conduct a session management policy establishment or modification process, with the selected PCF node 218 (607B).

As also shown in FIG. 6A, SMF node 210 may select a UPF node 208 (608) and notify NEF 220 or IP Proxy 108 with an IP address of the UE device 104 requesting the session (608AB—NotifyProxy). In response, IP Proxy 108 may place the UE device IP address in routing table 402. IP proxy 108 may capture the UE source port when a UE device 104 sends a MO IP packet towards AF node 102. IP Proxy 108 may store the UE port for preparing subsequent MT IP message back to UE device 104.

In addition, SMF node 210 may exchange messages for session management policy modification with PCF node 218 (609). As a consequence of the exchange, SMF node 210 may send a session establishment modification request to and receive a reply from the selected UPF node 208, over N4 interface (610A and 610B). During the latter exchange, UPF node 208 may have received the PCC rule to redirect UE device 104-originated IP messages to IP Proxy 108. UPF node 208 may install the received PCC rule in routing table 402.

Process 500 may include completing the setup of the session requested by UE device 104 (block 510). As further illustrated in FIG. 6A, after installing the PCC rule at UPF node 208, SMF node 210 may indicate to AMF node 206 that the requested session is to be established (611). In response, AMF node 206 may request AN 604 to complete the session set up (612). Accordingly, AN 204 may exchange messages with UE device 104, set up resources for the session, and receive a session establishment acceptance notice from UE device 104 (613). In addition, AN 204 may send an acknowledgment message to AMF node 206 (614).

Process 500 may further include receiving uplink IP data from UE device 104, redirecting the IP data to IP Proxy 108, translating the redirected IP data into T8 messages, and forwarding the T8 messages to AF node 102 (block 512). In FIG. 6B, uplink data (690), which is IP data, is represented by a dotted line extending from UE device 104 to UPF node 208. The IP data from UE device 104 is redirected by UPF 208 to IP Proxy 108 in accordance with the PCC rule installed at UPF node 208 (691). IP Proxy 108 may translate the redirected IP data into T8 messages and forward the T8 messages to AF node 102.

In FIG. 6B, the flow of uplink data is followed by a couple of messages between nodes. For example, after the flow of uplink data (690), AMF node 206 may send a request to SMF node 210 over Nsmf interface (615). In addition, SMF node 210 may send a session modification request to UPF node 208 over N4 interface (616A).

Process 500 may further include receiving T8 API messages from AF node 102 at NEF 220/IP Proxy 108; translating T8 API messages into IP data; and sending the IP data to UE device 104 through UPF node 208 (block 514). As shown in FIG. 6B, a T8 API message is sent from AF node 102 to T8 interface on NEF 220/IP Proxy 108. IP Proxy 108 translates the T8 API message into IP data. IP Proxy 108 forwards the IP data to UPF node 208 (694), which then forwards the data to UE device 104 (695).

In FIG. 6B, the flow of downlink data is followed by messages between nodes. For example, after the flow of downlink data (695), AMF node 206 may send a response to SMF 210 over N4 interface (616B), and SMF node 210 may send a response to a request to update the session context (617).

Other messages may also follow after the uplink and downlink data to/from UE device 104 and AF node 102. For example, SMF node 210 may send a session status notification to AMF node 204 (618) and a message to configure IPv6 address to UPF node 208. UPF node 208 may then forward the message to UE device 104 (619). In another example, SMF node 210 may exchange messages related to deregistration with UDM node 214 (620).

In FIG. 6B, a cellular network security domain 622 may extend from UE device 104 to IP Proxy 108, and AF node 102 may communicate with IP Proxy 108 over a secured interface 624. Accordingly, all segments of communication paths from UE device 104 to AP node 102 are secure. The configuration in FIG. 6B thus provides a Mobile Virtual Private Network (MVPN) equivalent service but in a much more cost-effective and efficient manner. There is no need to employ relatively complex end-to-end IPSec protocol or implement Transport Layer Security (TLS) (i.e., from UE device 104 to AP node 102).

In FIGS. 6A and 6B (as well as FIGS. 2B and 4), to have NEF node 220 or IP Proxy 108 construct and maintain routing table 402, SMF node 210 reports the IP address TO NEF/SCEF 220/IP proxy 108. This feature allows AF node 102 to deliver downlink data without first requiring a UE device to send uplink IP data. In contrast, in many 5G systems, a UE device must send uplink IP data before an AF node can send downlink data to the UE device, so that the AF node can learn the IP address and the port number of the UE device—an inefficient and inconvenient requirement.

This feature may improve security of the system, as IP addresses of UE devices 104 are not exposed to external networks outside of the carrier security domain. Furthermore, no firewall pinhole needs to be created statically. A link between AF node 102 and NEF/SCEF 220 is over HTTPS, and, thus, is secure.

In FIGS. 6A and 6B (as well as FIGS. 2B and 4), rather than having a modified AF node 102 directly handle IP messages from UE device 104, NEF node 220 and/or IP Proxy 108 performs the translation function. The architecture allows software developers to: avoid having to implement inconsistently designed AF nodes to handle IP data over the user plane; and use a consistent software framework to service new and legacy applications running on IoT devices. For example, the architecture may allow UE devices 104 to continue to run IP-based client applications, while AF nodes 102 (e.g., application servers) use unified T8 for higher network layer information transfer (e.g., MQTT CoAP, and LWM2M protocol layers).

Figure 7:
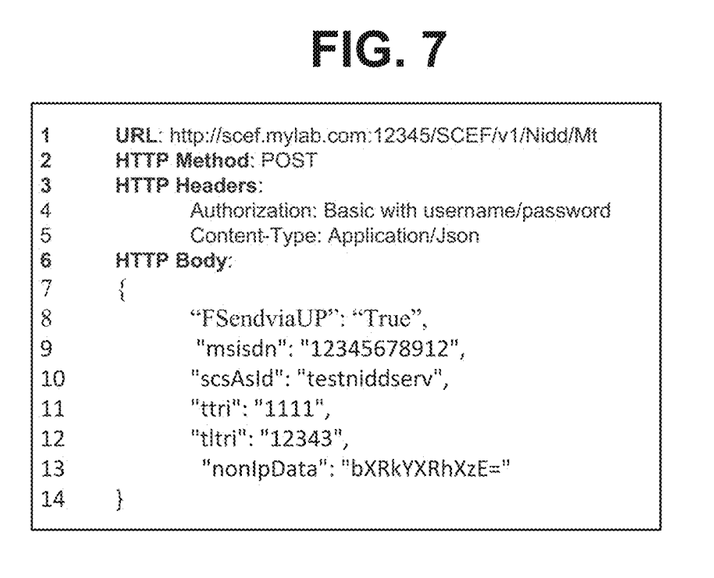
FIG. 7 illustrates a description of an exemplary call from the Application Function (AF) intercepted by the IP Proxy of FIG. 2B.

FIG. 7 illustrates a description of an exemplary T8 call, from AF node 102, that is received at IP Proxy of 108 according to one implementation. As shown T8 API call is to be made as JavaScript Object Notation (JSON) data. The T8 API call described in FIG. 7 is to be translated by IP Proxy 108, and hence carries a "SendviaUP" flag at line 8. In addition, the message carries MSISDN as the UE device ID (line 9). Data at line 13. In FIG. 7, the port number of UE device 104 is not provided in the T8 message, and thus IP proxy 108 would obtain the port number of UE device 104 based on the configuration of IP proxy 108 (e.g., during on-boarding of AF nodes 102).

After the translation, data at line 13 may be converted into an IP message payload.

In this specification, various preferred embodiments have been described with reference to the accompanying drawings. It evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIG. 5 and the messaging diagrams of FIGS. 6A and 6B, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:
   one or more network interfaces to communicate with a user equipment (UE) device; and
   one or more processors to:
      receive a request from the UE device to establish a session over a user plane of a network;
      establish the session over the user plane in response to the request from the UE device;
      receive, at a first node comprising a User Plane Function (UPF), an Internet Protocol (IP) message from the UE device over the session;
      redirect the received IP message at the first node to a second node comprising one of a Service Capability Exposure Function (SCEF) or an IP proxy included in a Network Exposure Function (NEF) for translating the IP message to a first T8 message;
      translate, at the second node, the redirected IP message to the first T8 message, wherein translating the redirected IP message to the first T8 message includes converting a payload of the IP message into a payload of the first T8 message; and
      forward the first T8 message to an application server or an application function (AF) node.

2. The system of claim 1, wherein the network includes one or more of:
   a 4G network; or
   a 5G network.

3. The system of claim 1,
   wherein the one or more processors are further configured to apply a Policy and Charging Control (PCC) rule to the UPF node, and
   wherein the PCC rule requires the UPF node to forward the received IP message to the second node.

4. The system of claim 3, wherein the one or more processors are further to:
   store the PCC rule at a Policy Control Function (PCF) node.

5. The system of claim 3, wherein the one or more processors are further to:
   cause the NEF to instantiate the IP proxy.

6. The system of claim 3, wherein the one or more processors are further to:
   create a table for translating a user plane IP message into a T8 message, wherein the table includes one or more records, and
   wherein each record includes:
      a first field for storing a Universal Resource Locator (URL) of the application server; and
      a second field for storing at least an IP address of the application server.

7. The system of claim 6, wherein the one or more processors are further to:
   insert one or more of the records during an on-boarding process for the application server.

8. The system of claim 6, wherein the one or more processors are further to:
   send a notification message to the second node when the UE device attaches to the network, and
   cause the second node to update a first record, among the records, with information provided in the notification message, and
   wherein the information includes an IP address of the UE device and an identifier for the UE device.

9. The system of claim 8, wherein the identifier includes a Mobile Station International Subscriber Directory Number (MSISDN).

10. The system of claim 1, wherein the one or more processors are further to:
    receive, at the second node, a mobile-terminated (MT) T8 message from the application server;
    translate, at the second node, the MT T8 message to a MT IP message; and
    forward the MT IP message to the UE device.

11. A method comprising:
    receiving a request from a UE device to establish a session over a user plane of a network;
    establishing the session over the user plane in response to the request from the UE device;
    receiving, at a first node comprising a User Plane Function (UPF), an Internet Protocol (IP) message from the UE device over the session;
    redirecting the received IP message at the first node to a second node comprising one of a Service Capability Exposure Function (SCEF) or an IP proxy included in a Network Exposure Function (NEF) for translating the IP message to a first T8 message;
    translating, at the second node, the redirected IP message to the first T8 message, wherein translating the redirected IP message to the first T8 message includes converting a payload of the IP message into a payload of the first T8 message; and
    forwarding the first T8 message to an application server or an application function (AF) node.

12. The method of claim 11, wherein the network includes one or more of:
    a 4G network; or
    a 5G network.

13. The method of claim 11,
    wherein the method further comprises applying a Policy and Charging Control (PCC) rule to the UPF node, and
    wherein the PCC rule requires the UPF node to forward the received IP message to the second node.

14. The method of claim 13, further comprising:
    storing the PCC rule at a Policy Control Function (PCF) node.

15. The method of claim 13, further comprising:
    instantiating, by the NEF in the network, the IP proxy.

16. The method of claim 13, further comprising:
    creating a table for translating a user plane IP message into a T8 message, wherein the table includes one or more records,
    wherein each record includes:

a first field for storing a Universal Resource Locator (URL) of the application server; and a second field for storing at least an IP address of the application server.

17. The method of claim 16, further comprising:

inserting one or more of the records during an on-boarding process for the application server.

18. The method of claim 16, further comprising:

sending a notification message to the second node when the UE device attaches to the network, and updating a first record, among the records, with information provided in the notification message, wherein the information includes an IP address of the UE device and an identifier for the UE device.

19. The method of claim 18, wherein the identifier includes a Mobile Station International Subscriber Directory Number (MSISDN).

20. The method of claim 11, further comprising:

receiving, at the second node, a mobile-terminated (MT) T8 message from the application server;

translating, at the second node, the MT T8 message to a MT IP message; and forwarding the MT IP message to the UE device.

\* \* \* \* \*